2,956,090

PROCESS FOR THE PURIFICATION OF GASEOUS OLEFINS

Otto Liethen, Duisburg-Beeck, and Walter Rottig, Oberhausen-Sterkrade-Nord, Germany, assignors to Ruhrchemie Aktiengesellschaft, Oberhausen-Holten, Germany No Drawing. Filed Feb. 4, 1959, Ser. No. 791,014

Claims priority, application Germany Feb. 12, 1958

3 Claims. (Cl. 260—677)

In the polymerization of low molecular weight olefins by means of catalysts as disclosed in Belgian Patents Nos. 533,362 and 534,792 and in "Angewandte Chemie," 67, 541–547 (1955), the alkylenes constituting the starting materials must be purified very thoroughly. Thus, oxygen, oxygen-containing compounds and water as well as all sulfur compounds of inorganic or organic nature must be largely removed. The purification of the alkylenes being in form of gases with high olefin contents cannot be carried out with the conventional means used in desulfurization processes. It appears that the low molecular weight olefins in high concentrations frequently tend to undergo side reactions or decomposition or that the purification effected under particularly careful conditions cannot be carried to the degree of purity desired.

According to the present invention there is provided a new process in which gases, particularly those used for the polymerization to form polymers having molecular weights in excess of 5,000 and preferably in excess of 10,000, and consisting for the most part of olefins having from 2 to 5 carbon atoms and inert gases, are freed from compounds of sulfur and oxygen, which process comprises passing said gases, in the presence of small amounts of hydrogen, oven reduced catalysts of the iron group using temperatures between 20 and 100° C. and preferably between 20 and 60° C. The inorganic and organic sulfur present in these gases is absorbed by the catalyst and combined chemically, e.g. as NiS or CoS, and remains in the catalysts which gradually decreases in efficiency. If particularly extensive utilization of all possibilities resulting from the stoichiometric ratios and the position of equilibria is intended, it is advantageous to effect such a purification in two or more stages.

For the conversion of the organically combined sulfur, the presence of small amounts of hydrogen is necessary. The small quantities of about 1–2% $H_2$ generally present in the gases to be purified are sufficient for this purpose. If, however, no hydrogen is present, an appropriate quantity is to be added, as little as 0.25 to 1% $H_2$ being sufficient for high olefin concentrations with little sulfur contaminants and up to about 2% being adequate in case of somewhat higher sulfur contents. The hydrogen may be added in form of pure hydrogen but also in form of a mixture with inert gases, e.g. an $H_2/N_2$ mixture comprising 75% $H_2$ and 25% $N_2$ as used as the starting gas for the synthesis of ammonia, or in mixture with methane or other gases. The inert gases can be present in quantities up to equal amounts of that of the hydrogen present.

The temperatures used in the purification range between about 20 and 100° C. and preferably between 20 and 60° C. depending upon the quantity and type of sulfur compounds to be removed. The highest of these temperatures are necessary if the sulfur compounds are in form of cylic sulfur compounds, e.g., thiophene and its derivatives.

The pressure used in the process of the invention ranges between atmospheric pressure and about 100 kg./cm², the prefered range being between atmospheric pressure and 25 kg./cm².

The olefinic gas to be purified is passed over the catalyst at a rate of about 250 to 2000 volumes of gas per volume of catalyst per hour.

Of particular importance in carrying out the purification in accordance with the invention is the content of reduced metal in the catalysts used. It has been found surprisingly that gases having high olefin concentrations, e.g., in excess of 90% and particularly in excess of 97%, must not be contacted with catalysts having a content of reduced metal of more than 80% since otherwise side reactions of the olefin to be purified occur, e.g., polymerization to form liquid products or deposition of carbon on the catalyst, disintegration of the catalyst granules and similar phenomena.

Extensive studies have shown that gases having high olefin concentrations, i.e., in excess of 90% and preferably in excess of 97%, can only be purified satisfactorily if the reduction value of the iron group catalyst used, particularly of the cobalt or nickel catalyst, is below 80% and preferably below 60% based on the total metal content. Reversely, those gases having an olefin content of below 90% can be purified without any difficulties with catalysts having a reduction value of 80% based on total metal content.

After the removal of the sulfur compounds, any contaminations still present, e.g. CO, $CO_2$, $O_2$, etc. are removable particularly well if, in a new stage, the gas is passed over a diluted catalyst containing about 5 to 10% Ni at a temperature in the range of about 150 to 200° C. If desired, a small quantity of hydrogen again may be added for this operational step.

Of the iron group catalysts used for the process according to the invention, cobalt and nickel catalysts have proved particularly suitable. Although various types of catalysts, such as precipitated, Raney, sintered or decomposition catalysts may be used, precipitated nickel and cobalt catalysts have given the best results. These catalysts may be prepared in a known manner with the addition, if desired, of carrier materials such as kieselguhr, activated earths, $Al_2O_3$ and the like which may be used in amount between 5 and 200 parts based on 100 parts of metal. Of advantage is also the addition of activators such as magnesia, thorium oxide, etc. in amounts up to 20%.

The invention now will be further explained by the following examples. However, it should be understood that these are given merely by way of illustration, not of limitation, and that numerous changes may be made in the details without departing from the spirit and the scope of the present invention as hereinafter claimed.

EXAMPLE 1

One liter of a reduced nickel-magnesia catalyst is carefully placed, under a protective nitrogen atmosphere, in a reactor of 40 mm. in diameter, 1,400 mm. in length and equipped with means for electrical heating.

Composition of the propylene to be purified:

$N_2+O_2$ ---------------------------------------- 0.02%
$CO_2+C_2H_2$ ------------------------------------ 0.01%
$C_2H_4$ ----------------------------------------- 0.04%
$C_2H_6$ ----------------------------------------- 0.06%
$C_3H_8$ ----------------------------------------- 0.02%
$C_3H_6$ ----------------------------------------- 99.86%
Sulfur -------------- Appr. 4–6 g. in 100 normal m.³

The raw propylene is mixed with 0.5% of a hydrogen-nitrogen mixture (75% $H_2$ and 25% $N_2$) and passed over the nickel-magnesia catalyst at 50° C. The reduction value of the catalyst is 80% and the gas flow rate 300 liters/hr.

After a short period of reaction, an increase in reactor temperature to about 200° C. is observed. At the same time, a pressure drop in the unit and the formation of liquid products can be observed. Upon withdrawal of the catalyst, it is found that the catalyst has undergone disintegration and that carbon and higher molecular weight hydrocarbons have been formed.

When the same feed mixture was passed at room temperature over the same catalyst reduced to the same degree, an increase in reaction temperature after some time, a pressure drop and the formation of liquid products were observed again. With a lower gas flow rate, the same observations were made although the increase in temperature was somewhat slower.

When the nickel-magnesia catalyst is charged with a reduction value of 55% and the same feed mixture is passed over the catalyst at 50° C., an increase in temperature, a pressure drop and the formation of higher hydrocarbons are not observed. The service life of this catalyst is several months.

When, instead of the nickel-magnesia catalyst, a cobalt-magnesia catalyst having a reduction value of 60% is used while feeding the same gas mixture at a reaction temperature of 50° C., satisfactory operation over an extended period of time also is attained. The reaction temperature remains at a constant level for weeks.

When the gas mixture pretreated in the manner described above is subsequently passed at 200° C. through a reactor filled with a nickel-alumina catalyst (reduction value, 90%), thereafter through a 40% aqueous potassium hydroxide solution (20° C.), thence through 3 tanks cooled to −35° C. of which the first is empty and the other two are filled with silica gel, and is finally passed at room temperature through towers containing potassium hydroxide fused on pumice (60% pumice and 40% KOH), the resultant substance has a sulfur content of less than 1 p.p.m. and an oxygen content of about 5 p.p.m. (as determined with a phenyl isopropyl potassium solution).

The following examples describe the preparation of the catalyst types mentioned in Example 1.

EXAMPLE 2

Nickel-magnesia catalyst 22.25 kg. nickel nitrate ($Ni(NO_3)_2.6H_2O$) and 4.3 kg. magnesium nitrate ($Mg(NO_3)_2.6H_2O$) are dissolved in 150 liters condensate water. Into the stirred solution heated at 100° C., a 10% aqueous sodium carbonate solution of 100° C. is added until the pH is 8.8. At this point, 2.7 kg. of kieselguhr are added. The mixture is subjected to suction filtration and the filtration residue is thoroughly washed with condensate water.

The filtration residue is processed to form cylindrical pellets of 5 mm. thickness which, after drying at 80° C., are reduced for 1.5 hours with a hydrogen-nitrogen mixture (75% $H_2$ and 25% $N_2$) using a temperature between 300 and 400° C. depending upon the reduction value desired.

EXAMPLE 3

Cobalt-magnesia catalyst 29.6 kg. cobalt nitrate ($Co(NO_3)_2.6H_2O$) and 5.7 kg. magnesium nitrate ($Mg(NO_3)_2.6H_2O$) are dissolved in 150 liters condensate water. To the stirred solution heated at 100° C. a hot 10% aqueous solution of sodium carbonate is added until the pH is 8.8. At this point, 6 kg. of kieselguhr are added and the mixture is subjected to suction filtration. The filtration residue is thoroughly washed with condensate water and processed to form cylindrical pellets of 3.5 mm. thickness. The pellets are dried at 120° C. and reduced for 1.5 hours with a hydrogen-nitrogen mixture (75% $H_2$ and 25% $N_2$) at a temperature between 300 and 400° C. depending upon the reduction value desired.

EXAMPLE 4

Nickel-alumina catalyst 8.5 kg. nickel nitrate ($Ni(NO_3)_2.6H_2O$) and 5 kg. aluminum nitrate ($Al(NO_3)_3.9H_2O$) are dissolved in 150 liters condensate water. To the stirred solution, a 10% aqueous ammonia solution is added at 75° C. until the pH is 7. Upon addition of 16 kg. kieselguhr, the mixture is filtered, the filtration residue is washed with condensate water and processed to form cylindrical pellets of 3.5 mm. thickness. After drying at 120° C., the pellets are reduced for 2 hours with a hydrogen-nitrogen mixture (75% $H_2$ and 25% $N_2$). The reduction temperature is about 400° C. and the reduction value of the catalyst is about 90%.

We claim:

1. A process for the purification of gases consisting essentially of olefins having from 2 to 5 carbon atoms and an olefinic content of at least 90 percent which comprises passing said gases over reduced catalysts of the iron group at a temperature ranging from 20° to 100° C., said gases containing from about 0.25 to 2 percent of hydrogen, and said catalysts having an initial reduced metal content of less than 80 percent.

2. The process of claim 1, wherein said temperature ranges from 20° to 60° C., and said iron group catalysts are selected from the class consisting of nickel and cobalt and have an initial reduced metal content of 55 to 60 percent.

3. The process of claim 1, wherein said gases, after passage over said catalyst, are passed in a final step over a reduced iron group catalyst containing about 5 to 10 percent iron group metal at a temperature ranging from about 150° to 200° C.

References Cited in the file of this patent

UNITED STATES PATENTS

| | | |
|---|---|---|
| 2,073,578 | Gwynn | Mar. 9, 1937 |
| 2,273,299 | Szayna | Feb. 17, 1942 |
| 2,511,453 | Barry et al. | June 13, 1950 |
| 2,516,876 | Horne et al. | Aug. 1, 1950 |